T. W. LIGHTFOOT.
TRACTOR.
APPLICATION FILED OCT. 12, 1914.

1,187,350.

Patented June 13, 1916.
4 SHEETS—SHEET 2.

Witnesses
J. H. Crawford
R. H. Hoster

Inventor
T. W. Lightfoot,
By Victor J. Evans
Attorney

T. W. LIGHTFOOT.
TRACTOR.
APPLICATION FILED OCT. 12, 1914.
1,187,350.
Patented June 13, 1916.
4 SHEETS—SHEET 3.
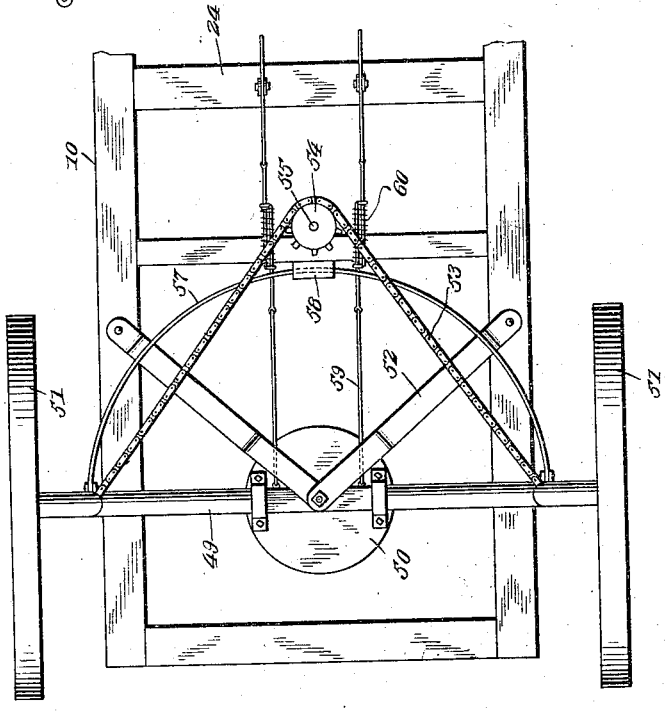

T. W. LIGHTFOOT.
TRACTOR.
APPLICATION FILED OCT. 12, 1914.
1,187,350.
Patented June 13, 1916.
4 SHEETS—SHEET 4.
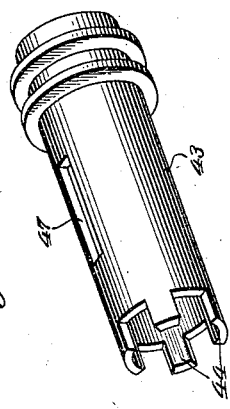
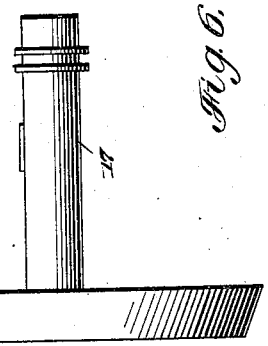
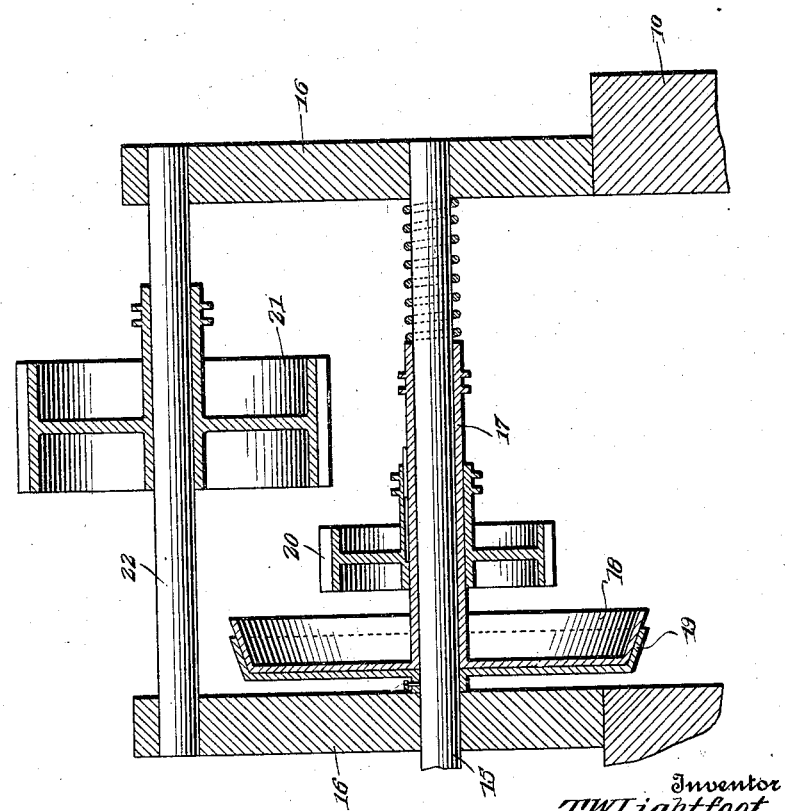
Witnesses
Inventor
T. W. Lightfoot,
By Victor J. Evans.
Attorney

UNITED STATES PATENT OFFICE.

THOMAS W. LIGHTFOOT, OF YORKTOWN, TEXAS.

TRACTOR.

1,187,350.  Specification of Letters Patent. Patented June 13, 1916.

Application filed October 12, 1914. Serial No. 866,370.

*To all whom it may concern:*

Be it known that I, THOMAS W. LIGHTFOOT, a citizen of the United States, residing at Yorktown, in the county of Dewitt and State of Texas, have invented new and useful Improvements in Tractors, of which the following is a specification.

This invention relates to road engines and the like and has for an object to provide a tractor particularly adaptable for use in connection with agricultural implements such as plows, for the purpose of advancing the implements over the ground.

The invention contemplates among other features the provision of a tractor which is of a simple construction having its parts so arranged that ready access can be had thereto for the purpose of repairing the same when they become worn, the tractor furthermore being of a light and durable construction to effectively accomplish the desired result, namely the advancement of an agricultural implement over the ground.

Figure 1:
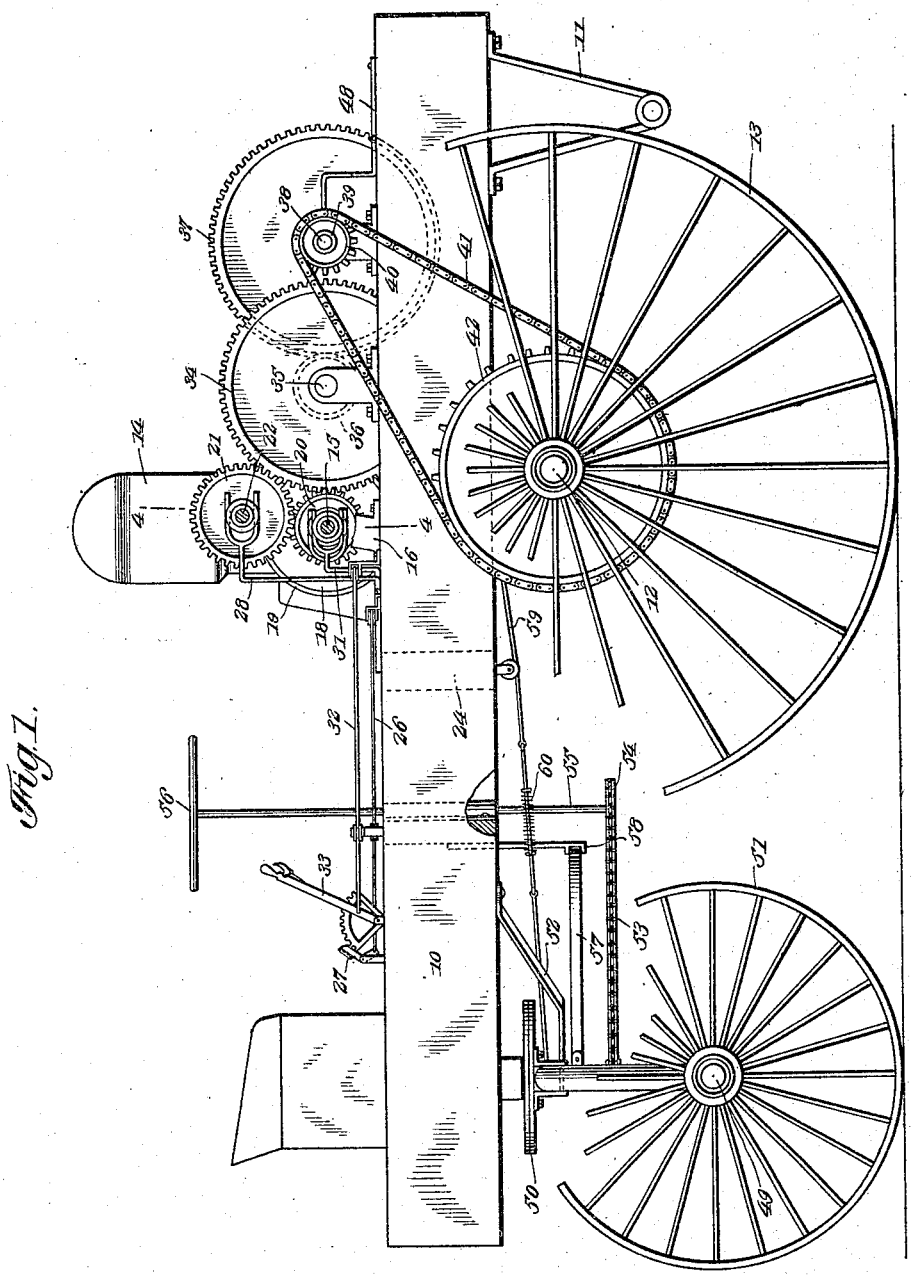
Figure 2:
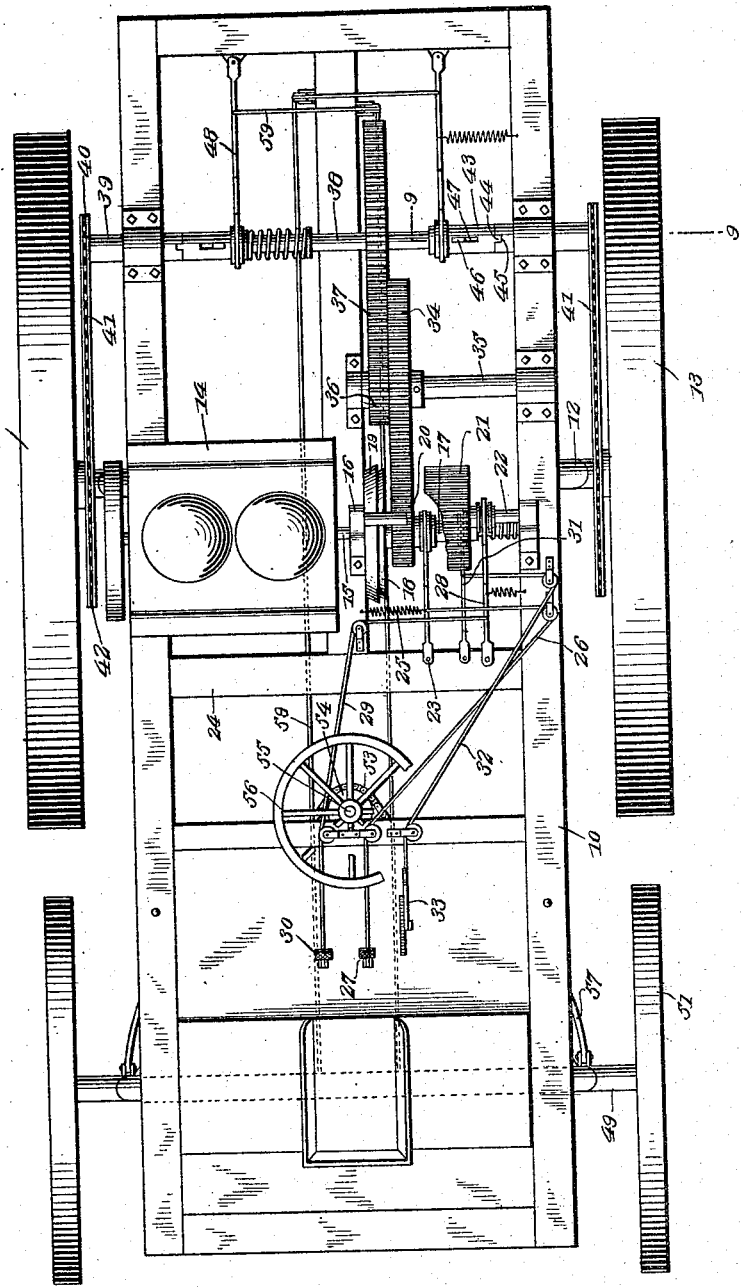

In the further disclosure of the invention reference is to be had to the accompanying drawings, constituting a part of the specification, in which similar characters of reference denote corresponding parts in all the views, and in which:

Figure 1 is a fragmentary side elevation of the tractor, Fig. 2 is a plan view of the tractor, Fig. 3 is a fragmentary bottom plan view of the rear of the tractor, Fig. 4 is a fragmentary enlarged vertical sectional view taken on line 4—4 in Fig. 1, Fig. 5 is a perspective view of one of the clutch sleeves, Fig. 6 is a side elevation of the friction disk, Fig. 7 is a side elevation of the adjusting member for the rearwardly extending tables, Fig. 8 is a side elevation of the toothed wheel on the engine shaft, and Fig. 9 is a vertical longitudinal sectional view taken on the line 9—9 in Fig. 2.

Referring more particularly to the views I provide a body 10 in the nature of a frame and which at its forward edge is provided with a depending hanger 11 to which is adapted to be attached the agricultural implement such as a plow or the like. A front axle 12 supports a plurality of wheels 13 and a suitable internal combustion engine 14 is carried upon the body 10 said engine including a shaft 15 journaled in suitable uprights 16 on the body. Loosely mounted upon the shaft 15 is a sleeve 17 carrying a suitable friction disk 18 and which is adapted to be advanced into frictional engagement with a disk-like member 19 keyed to the shaft 15. Free to rotate with the sleeve 17 is a toothed wheel 20 which however will slide longitudinally upon the sleeve and adapted to mesh with a toothed wheel 21 carried upon a shaft 22 journaled in the uprights 16. A lever 23 is mounted to swing about a cross piece 24, said lever engaging with and operating upon the toothed wheel 20 as clearly shown in Fig. 2 of the drawing. A spring 25 normally holds the lever in position to hold the toothed wheel 20 out of engagement with the toothed wheel 21 and a cable 26 has connection with the lever 23 and terminates in a suitable foot lever 27; in like manner a similar lever 28 is arranged for connection with the toothed wheel 21 and has a cable 29 passing to an operating lever 30, and similarly a lever 31 operates upon the sleeve 17 and has connection with a cable 32 terminating in a foot lever 33, it being clearly seen that when the toothed wheels 20 and 21 intermesh and the tooth wheel 21 meshes with a tooth wheel 34 carried on a shaft 35, the toothed wheel 34 will be rotated in one direction whereas a direct intermeshing of the toothed wheels 20 with the toothed wheel 34 will cause the tooth wheel 34 to rotate in the opposite direction, the toothed wheel 21 constituting the idler which is interposed between the toothed wheels 20 and 34 would result in a reversal of rotation, it being understood, of course that the friction disk 18 is at this time in frictional contact with the member 19.

The shaft 35 carries a smaller toothed wheel 36 meshing with a toothed wheel 37 on a shaft 38 journaled upon the body 10. At each end of the shaft 38 there is arranged to rotate a sleeve 39 bearing a toothed wheel 40 over which passes a chain 41 said chain also passing over a toothed wheel 42 free to have the wheels 13 rotate therewith, each wheel 13 being supported upon an independent axle 12 as mentioned heretofore. A locking sleeve is provided for each sleeve 39 said locking sleeve being indicated by the numeral 43, with the locking sleeve 43 provided with a series of projections 44 adapted to extend into recesses 45 in the sleeves 39 whereby to lock the locking sleeve 43 with the sleeves 39, the sliding movement of the locking sleeve 43 upon the shaft 38 being lessened by a pin 46 projecting into a slot 47 in the locking sleeve. A lever 48 preferably spring actuated is mounted upon the body and one is provided for each locking sleeve 43 to normally hold the locking sleeve in engagement with the sleeves 39 thus insuring rotation of the toothed wheels 40, said locking sleeve 43 being free to rotate with the shaft 38 and slidable longitudinally thereof. Thus it will be seen that there is provided a suitable means for completing the driving connection between the engine and the traction wheel 13 to advance the vehicle over the ground when the engine is operated when connection is effected between the engine and driving wheels.

It will be seen from the foregoing description that the engine can be thrown out of driving engagement with the wheels 13 when it is desired to have the vehicle remain stationary without stopping the engine.

A substantially U-shaped rear axle 49 is arranged to turn upon a turn table 50 said axle having the usual rear wheels 51 connected thereto and which are termed the steering wheels. Braces 52 are provided for properly supporting the axle 49 to turn and a chain 53 passing over a toothed wheel 54 has its ends secured to the axle 49, said toothed wheel 54 being keyed to a steering rod 55 projecting upwardly through the body 10 and provided with a steering wheel 56. A semi-circular guide member 57 is secured to the axle 49 and slides in a sleeve-like member 58 secured to the under side of the body 10 as shown in Figs. 1 and 3. Now it will be clearly seen that by operating the steering wheel 56 the rear axle can be turned so as to steer the vehicle as it advances over the ground.

Each of the levers 48 has connection with a cable 59 which passes rearwardly and connects with the axle 49, one of said cables being connected to one side of the pivotal point of the axle and the other cable to the other side thereof, with any suitable form of adjusting devices such as indicated by the numeral 60 being arranged upon the cable to take up any slack thereon.

Now as mentioned heretofore the clutch sleeve upon the shaft 38 normally locks with the sleeve 39 so that as the vehicle is advanced over the ground rotation will be imparted to the wheel 13 which assures the advancement of the vehicle over the ground. Now when it is desired to maneuver a turn in the road and the operator turns the steering wheel 56 thereby turning the wheel 51 at an angle to the body of the vehicle for the purpose of negotiating the turn, it will be seen that one of the cables 59 will be slacked whereas the pull will be exerted on the other cable 59 and the pull exerted on the latter cable 59 will cause the lever 48 connected with said cable to be operated and move the clutch sleeve thereon out of engagement with the particular sleeve 39 with which it is associated, thus causing a discontinuance of rotation of the wheel 13 which is on the inner side of the vehicle when the turn is being negotiated, this being accomplished without interfering with the rotation of the wheel 13 on the outer side of the vehicle so that the vehicle will swing as on a pivot and readily and quickly operate to properly advance around a turn or curve in the road. When the axle is again turned to a position where the axle 49 is at right angles to the body of the vehicle the cables 59 will both be taut and both clutches of said cables will be at opposite positions to insure the rotation of both wheels 13, simultaneously.

From the foregoing description it will be seen that there is provided a traction engine for use in advancing plows, or other agricultural implements over the ground and which in its operation can be advanced or retreated on the ground or highway. And it will be furthermore seen that in negotiating a turn the rear wheels of the engine are the steering means for properly operating and advancing the tractor around a curve in the road or highway, said rear wheels coöperating with the front wheels to insure continued rotation of the outer front wheel and a stopping of the rotation of the inner front wheel when the turn is negotiated through the medium of the rear steering wheels. It will also be seen that the various parts of the tractor are of simple construction and are so arranged that they can be easily looked after and kept in good condition furthermore being in such position that ready access can be had thereto for the purpose of repairing the same or replacing old parts for new ones.

Having described the invention what is claimed is:

A tractor including a rectangular frame, a rear steering axle arranged beneath the frame, a forward axle supported by the frame, ground wheels mounted on the respective axles, a motor supported on the frame, and driving mechanism intermediate said motor and the ground wheels on the forward axle, said driving mechanism including an independent shaft mounted above the frame, gearing intermediate said shaft and the motor, sleeves rotatably mounted on the shaft and extending within the plane of the frame, driving connections between the sleeves and the respective adjacent ground wheels, and a clutch mechanism intermediate each sleeve and the said shaft, said clutch mechanisms being arranged and operated wholly within the outline plane of the frame, and connections between each of said clutches and the remote axle.

In testimony whereof I affix my signature in presence of two witnesses.

THOMAS W. LIGHTFOOT.

Witnesses:
F. KRAEGE,
W. C. METZ.

Copies of this patent may be obtained for five cents each, by addressing the "Commissioner of Patents, Washington, D. C."